United States Patent [19]

Nishimura et al.

[11] 3,766,458
[45] Oct. 16, 1973

[54] SYSTEM FOR DRIVING A SELF-EXCITED PULSE MOTOR IN ACCORDANCE WITH THE MOVEMENT OF THE ROTOR

[75] Inventors: Tohru Nishimura, Akashi; Yoshitoshi Kibe; Yasuhiko Yokoshi, both of Kawasaki, all of Japan

[73] Assignee: Fujitsu Limited, Kawasaki, Japan

[22] Filed: Dec. 23, 1971

[21] Appl. No.: 211,430

[30] Foreign Application Priority Data
Dec. 28, 1970 Japan.............................. 45/124616

[52] U.S. Cl................... 318/313, 318/314, 318/640
[51] Int. Cl. ........................................... H02p 5/16
[58] Field of Search.................... 318/138, 313, 314, 318/318, 640

[56] References Cited
UNITED STATES PATENTS
3,462,663  8/1969  Schiller.............................. 318/640
3,514,685  5/1970  Burgess.............................. 318/313
3,514,679  5/1970  Larsen................................ 318/314

Primary Examiner—Gene Z. Rubinson
Attorney—Arthur E. Wilfond et al.

[57] ABSTRACT

A driving circuit of a self-excited pulse motor controls the stator in accordance with the movement of the rotor. The driving circuit includes a phase difference switching circuit for switching the phase difference between the phase of the motor and the exciting phase of the stator in correspondence with the speed of rotation of the rotor. The phase difference is switched every time that the speed of rotation reaches a predetermined speed, thereby compensating for the reduction of the torque during high speed rotation based on the time lag of an exciting signal in a feedback loop.

3 Claims, 17 Drawing Figures

FIG. 4b  L1 
FIG. 4c  L2 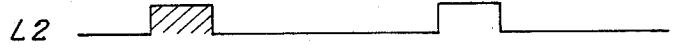
FIG. 4d  L3 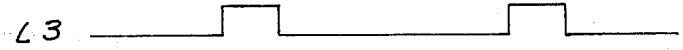
FIG. 4e  L4 
FIG. 4f  L5 

SYSTEM FOR DRIVING A SELF-EXCITED PULSE MOTOR IN ACCORDANCE WITH THE MOVEMENT OF THE ROTOR

The present invention relates to a pulse motor driving circuit. More particularly, the invention relates to a driving circuit for a self-excited pulse motor and permits stable high speed rotation regardless of variation of the load.

Two well known arrangements for driving pulse motors provide control pulses to an excitation switching circuit. One of these arrangements is a separately excited arrangement for switching the excitation of the stator by supplying from the outside a control pulse of any arbitrary time relation to the rotation of the rotor. The separately excited arrangement has the advantages of simple structure, facility in controlling the speed, and permissibility of high speed rotation. The separately excited arrangement, however, has the disadvantages that the rotation of the rotor contrary to a variation of the load is unstable because the relationship between the rotation of the rotor and the phase of the control pulse is not controlled.

The other arrangement is known as the self-excited arrangement. In the self-excited arrangement, the switching of the excitation of the stator is undertaken by a pulse signal which is produced by the detection of the rotation of the rotor. More particularly, the self-excited arrangement includes a detector for detecting the position of the rotor and a feedback loop is provided to the excitation windings of the stator. The output pulse signal produced by the rotor position detector sequentially switches the excitation phase of the stator when the phase difference between the phase of the motor at the rotor location and the exciting phase of the stator is maintained constant. Therefore, if the phase difference is set to provide a maximum torque, the rotor must continue to accelerate regardless of the speed. Actually, however, the torque decreases as the speed increases and the speed of rotation is saturated. As a result, the maximum speed of rotation in the self-excited arrangement is limited to a magnitude which is approximately less than half the maximum speed of rotation attained by the separately excited arrangement.

The printing speed of a line printer for an electronic computer system has been continually increased in recent developments. It is therefore desirable that the paper feeding speed be increased when a pulse motor is utilized to drive the paper feeder of a line printer. The self-excited arrangement is utilized as the driving arrangement due to its stability of movement regardless of the variation of the load. The self-excited arrangement does not, however, fully satisfy the requirement that the speed of rotation of the paper feeder of the line printer be increased because of the speed of rotation being saturated, as hereinbefore mentioned.

The principal object of the invention is to provide a pulse motor driving circuit which provides stable high speed rotation by compensating for a reduction in torque due to an increase in the speed of rotation.

An object of the invention is to provide a pulse motor driving circuit which is suitable for use in driving the paper feeder of a high speed line printer.

Another object of the invention is to provide a pulse motor driving circuit of simple structure which functions with efficiency, effectiveness and reliability.

We have discovered that there is a considerable amount of time lag until the pulse signal produced by the rotor position detector excites the stator. This is due to the passage of the pulse signal through an amplifier, an excitation switching circuit and a stator exciting circuit. The result is that as the speed of rotation is increased, the time lag considerably affects the reduction of the torque.

In accordance with the present invention, the phase difference between the phase of the motor and the exciting phase of the stator is switched whenever the speed of rotation of the rotor reaches a predetermined magnitude whereby the reduction in torque due to the time lag of the pulse signal is compensated.

In accordance with the invention, a pulse motor driving circuit for a pulse motor having a rotor and a stator having stator windings comprises rotor position detecting means for producing a phase signal corresponding to the phase of the motor at the rotor. Speed detecting means produces a speed signal corresponding to the speed of rotation of the rotor. Excitation switching means connected to the rotor position detecting means sequentially excite each stator winding by a signal corresponding to the rotor position. Phase difference switching means has inputs connected to the excitation switching means and coupled to the speed detecting means and outputs coupled to the stator windings and switches the phase difference between the phase of the motor and the exciting phase of the stator when the speed of rotation of the rotor reaches a predetermined magnitude corresponding to the speed signal.

The phase of the motor is the phase of the stator which corresponds mechanically to the position of the rotor.

The speed detecting means has an input coupled to the rotor and two outputs. A timer circuit connected to one of the outputs of the speed detecting means produces more than one standard pulse of different duration in accordance with the speed signal. Switch signal generating means has an input connected to the other of the outputs of the speed detecting means, inputs connected to the timer circuit and outputs connected to the phase difference switching means and produces a switching signal corresponding to the speed of rotation of the rotor in accordance with the relationship of the speed signal to the standard pulse. The switching signal switches the phase difference between the phase of the motor and the exciting phase of the stator.

The standard pulse produced by the timer circuit has a duration substantially equal to the time interval of the speed signal produced by the speed detecting means during a speed of rotation which is likely to produce one phase difference for the phase difference between the predetermined phase of the motor and the exciting phase of the stator.

In order that the invention may be readily carried into effect, it will now be described with reference to the accompanying drawing, wherein:

FIGS. 4a, 4b, 4c, 4d, 4e and 4f are graphical presentations illustrating the output pulse signal produced by the rotor position detector of the pulse motor driving circuit of FIG. 2;

Figure 1:
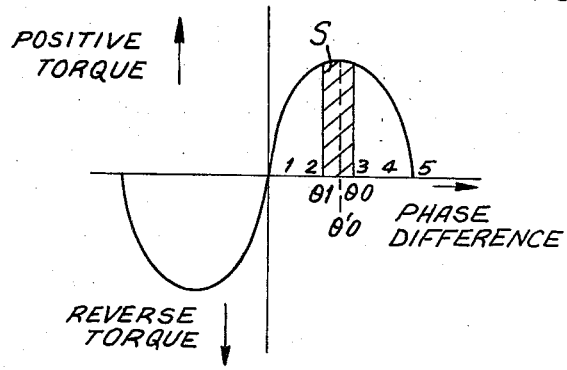
FIG. 1 is a graphical presentation illustrating the relationship of the torque of the phase difference between the phase of a pulse motor and the exciting phase of the stator of the pulse motor.

Generally, when driving a pulse motor, electrical or mechanical means is provided beforehand so that there is a constant phase difference between the phase of the motor and the exciting phase of the stator. In FIG. 1, for example, the phase difference is set at $\theta_o$. FIG. 1 illustrates the torque of a five phase pulse motor. In FIG. 1, the abscissa represents the phase difference $\theta$ and the ordinate represents the torque.

As indicated in FIG. 1, since the phase of the motor varies, when the phase difference is reduced by one phase so that it is $\theta_1$, the exciting phase of the stator is preceded by one phase by a phase detector, thereby making the phase difference $\theta_o$ again. The self-excited pulse motor continues a step operation by repeating the aforedescribed rotation and phase variation. Accordingly, in order to provide the maximum accelerating torque, it is desirable to set the phase difference at $\theta_o$ so that the magnitude S surrounded by torque curves $\theta_o$ and $\theta_1$ may become a maximum.

When the time lag of the pulse signal in a feedback loop from a phase detector of the motor to the excitation windings of the stator is taken into consideration, it becomes clear that the phase difference $\theta_o$ decreases as the speed of rotation of the motor increases. It is assumed that the time lag in the feedback loop is $\Delta T$ and that the speed of rotation of the motor or rotor is $\omega$. The actual phase difference $\theta'_o$ relative to the predetermined phase difference $\theta_o$ is then reduced to a phase difference which may be expressed as $\theta_o - T\omega$. As a result, the magnitude S of the torque curve gradually decreases until it becomes zero, when the speed is saturated.

Figure 2:
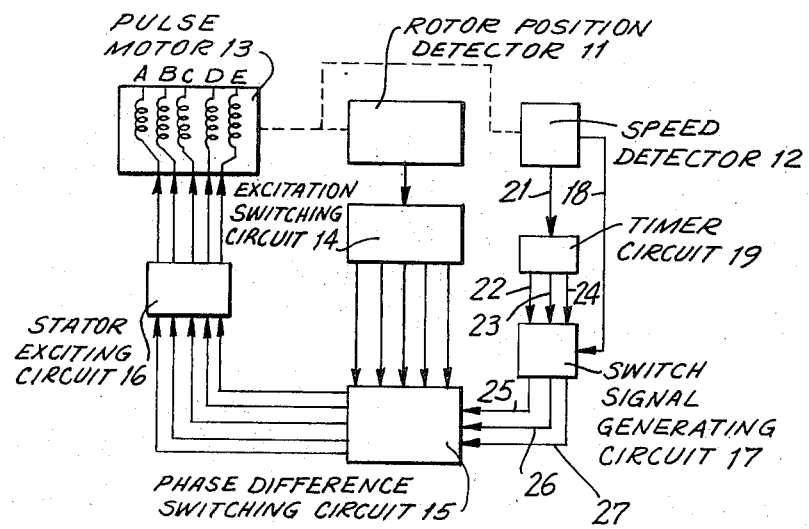
FIG. 2 is a block diagram of an embodiment of the pulse motor driving circuit of the invention.

FIG. 2 illustrates a preferred embodiment of the pulse motor driving circuit of the invention. The pulse motor driving circuit of the invention compensates for torque reduction based on time lag as hereinbefore mentioned. A rotor position detector or motor phase detector 11 and a speed detector 12 are coupled to the rotor of a pulse motor 13. The rotor position detector 11 is electrically coupled to the stator excitation windings A, B, C, D and E of the pulse motor 13 via an excitation switching circuit 14, a phase difference switching circuit 15 and a stator exciting circuit 16.

The speed detector 12 has an output connected to an input of a switch signal generator circuit 17 via an electrically conducting lead 18 and another output connected to the input of a timer circuit 19 via an electrically conducting lead 21. The timer circuit 19 has a plurality of outputs connected to corresponding inputs of the switch signal generating circuit 17 via electrically conducting leads 22, 23 and 24. The switch signal generating circuit 17 has a plurality of outputs connected to corresponding inputs of the phase difference switching circuit 15 via electrically conducting leads 25, 26 and 27.

Figure 3:
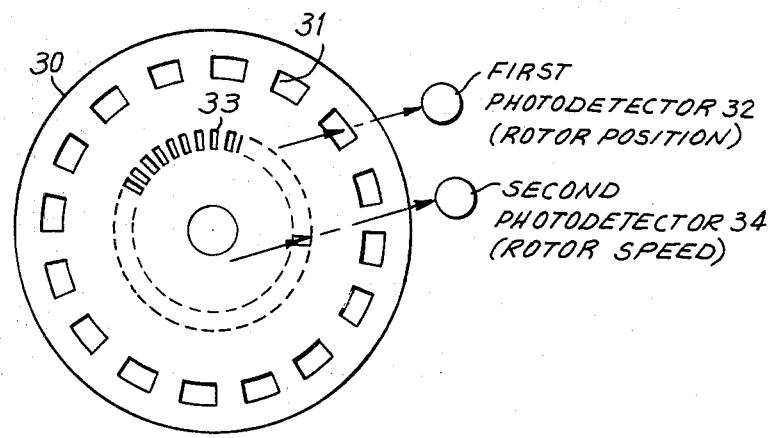
FIG. 3 is a schematic diagram of a pulse generator which may be utilized in the pulse motor driving circuit of FIG. 2.

The rotor position detector 11 and the speed detector 12 comprise a pulse generating disc affixed to, and rotating with, the shaft of the rotor and a photodetector, as shown in FIG. 3. In FIG. 3, a disc 30 has a first plurality of slits, slots, apertures, windows, holes, or the like, 31 formed therethrough on a circle having a predetermined radius. The slots 31 of the disc 30 are equidistantly spaced from each other by an interval corresponding to the movement of a single pulse of the rotor.

A suitable source of light is positioned on one side of the disc 30 at the same radius as the windows 31 from the center of said disc. The source of light is not shown in the FIGS., in order to enhance the clarity of presentation. A first photodetector 32 is positioned on the opposite side of the disc 30 at the radius of the windows 31 from the center of said disc. The first photodetector 32 thus produces one pulse signal for each step corresponding to the position of the rotor.

A second plurality of slits, slots, apertures, windows, holes, or the like, 33 are formed through the disc 30 on a circle having a predetermined radius different from that of the circle on which the windows 31 are formed. The radius of the circle of the windows 33 is smaller than the radius of the circle of the windows 31. A second photodetector 34 is positioned on the same side of the disc 30 as the first photodetector 32, but is at the same radius from the center of said disc as the windows 33. The windows 33 are equidistantly spaced from each other so that a time pulse corresponding to the speed of the rotor is provided by said windows.

Figure 4A:

The pulse signals produced by the first photodetector 32 are amplified by an amplifier (not shown in the FIGS.) and are then supplied to the excitation switching circuit 14. The excitation switching circuit 14 produces, in accordance with the position or phase signal supplied by the rotor position detector 11, a plurality of pulse trains L1, L2, L3, L4 and L5, as shown in FIGS. 4b to 4f, respectively. In the case of a single phase excitation arrangement, when the phase of the motor indicated by the oblique lines is A, as shown in FIG. 4a, the exciting phase of the stator is B. When the phase of the motor steps to B, the series of pulses L1 to L5 are sequentially added to the windings A, B, C, D and E of the stator of the pulse motor 10 via the stator exciting circuit 16 in a manner whereby the exciting phase proceeds to C.

Figure 5A:
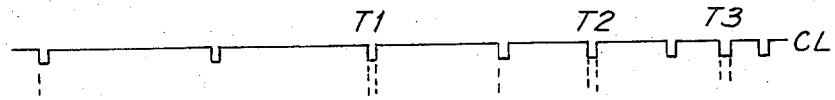
FIGS. 5a, 5b, 5c, 5d, 5e, 5f and 5g are graphical presentations illustrating the switching relation between the phase difference and the speed of rotation of the rotor.

The speed detector 12, which essentially comprises the second photodetector 34 of FIG. 3, produces a timing pulse CL, as shown in FIG. 5a. The timing pulse or speed signal produced by the speed detector 12 of FIG. 2 corresponds to the speed of rotation of the rotor or motor. The timing pulse CL is supplied to the timer circuit 19 of FIG. 2 via the lead 21.

Figure 5B:
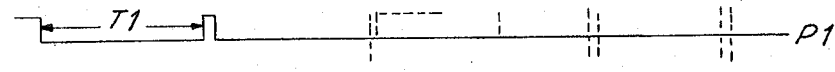
Figure 5C:
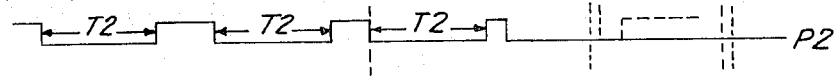
Figure 5D:
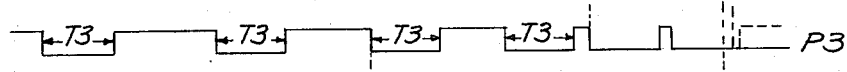

Three standard pulses P1, P2 and P3, as illustrated in FIGS. 5b, 5c and 5d, respectively, are produced by the timer circuit 19 in correspondence with the required switching stage number. More particularly, the timer circuit 19 comprises three monostable multivibrators having a form factor of 100 percent with different signal time durations. Each of the monostable multivibrators is triggered by the timing pulse CL to produce the standard pulses having time durations T1, T2 and T3, as shown in FIGS. 5b, 5c and 5d, respectively.

The time duration T1 of the first standard pulse P1 is set at the same time duration as the interval of the timing pulse CL during the speed of rotation when the reduction $\Delta T\omega$ of the phase difference due to the time lag becomes just one phase. The time duration T2 of the second standard pulse P2 is set at the time duration which is the same as the interval of the timing pulse CL during the speed of rotation when the reduction in phase difference due to the time lag becomes two phases. The time duration T3 of the third standard pulse P3 is set as equal to the time interval of the timing pulse CL during the speed of rotation when the reduction in the phase difference becomes three phases.

Figure 5E:
Figure 5F:
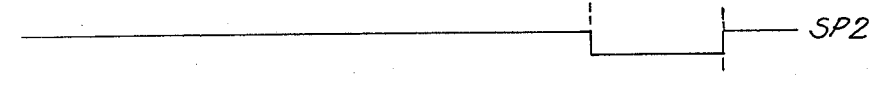
Figure 5G:
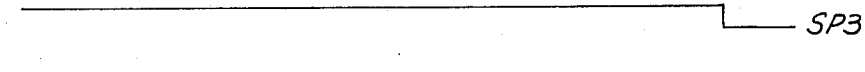

The aforedescribed three output standard signals produced by the timer circuit 19 are supplied to the switch signal generating circuit 17 via the leads 22, 23 and 24 and are compared with the timing pulse CL, which is directly supplied, so that a switch signal is derived at a point of time when both pulse signals coincide. More particularly, during the time interval T1, when the phase difference between the phase of the motor and the exciting phase of the stator decreases by one phase as the speed of rotation increases, the first standard pulse P1 overlaps the timing pulse CL. This results in the provision of a first switch signal SP1, as shown in FIG. 5e, on the lead 25 of FIG. 2. During the time interval T2, when the reduction in the phase difference due to the time lag becomes two phases as the speed of rotation is increased, the second standard pulse P2 overlaps the timing pulse CL. This results in the provision of a second switch signal SP2, as shown in FIG. 5f, on the lead 26 of FIG. 2. During the time interval T3, when the reduction in the phase difference becomes three phases, the third standard pulse P3 overlaps the timing pulse CL. This results in the provision of a third switch signal SP3, as shown in FIG. 5g, on the lead 27 of FIG. 2.

The switch signals SP1, SP2 and SP3 are thus supplied to the phase difference switching circuit 15. When the switch signals are SP1, SP2 and SP3, the exciting phase of the stator is switched so that the apparent phase difference between the phase of the motor and the exciting phase of the stator is increased by one phase each time.

Figure 6:
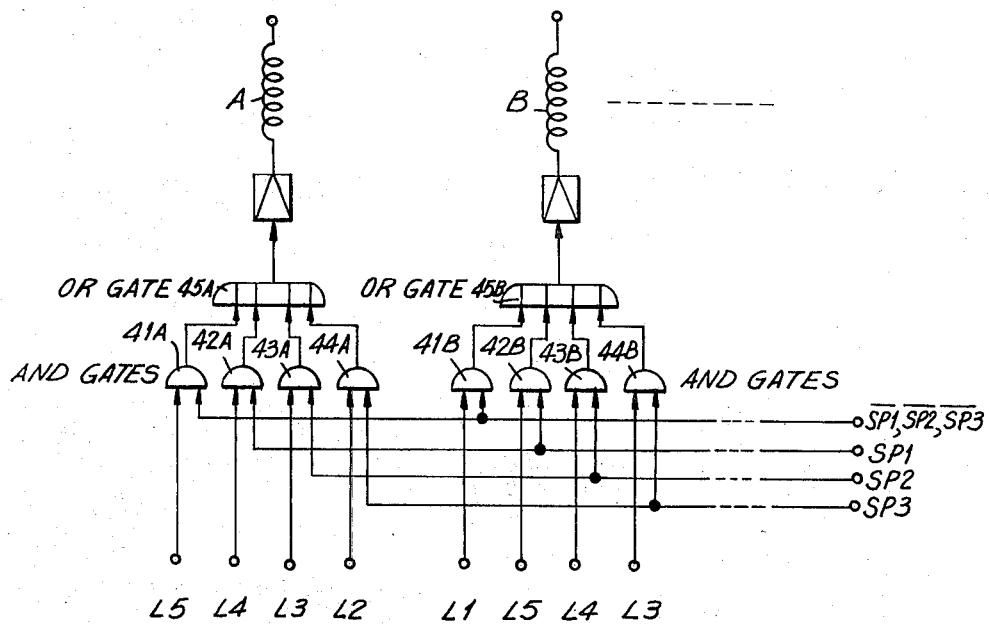
FIG. 6 is a circuit diagram of part of a phase difference switching circuit which may be utilized in the pulse motor driving circuit of FIG. 2.

FIG. 6 shows a part of the phase difference switching circuit 15. The part of the phase difference switching circuit 15 illustrated in FIG. 6 is that pertaining to the stator windings A and B. In FIG. 6, an exciting pulse signal L5, which is advanced by one phase above the phase of the motor, is supplied from the excitation switching circuit 14 to the stator winding A via an AND gate 41A and an OR gate 45A. The AND gate 41A is controlled in conductivity by the presence or absence of switch signals.

When the rotor reaches a specific constant speed of rotation and the first switch signal SP1 is produced, said first switch signal switches the AND gate 41A to its non-conductive condition and switches an AND gate 42A to its conductive condition so that the stator winding A is energized by the exciting pulse signal L4 which is advanced by two phases. The second switch signal SP2 switches an AND gate 43A to its conductive condition so that the three phase advanced exciting pulse signal L3 is supplied to the stator winding A. The third switch signal SP3 switches an AND gate 44A to its conductive condition so that the four phase advanced exciting pulse signal L2 is supplied to the stator winding A. The same switching circuit as that described for the stator winding A is repeated and provided for each of the other stator windings B, C, D and E, and operates in the same manner.

In the aforedescribed manner, the pulse motor of the invention provides the maximum torque continuously to the rotor regardless of the speed of rotation. The pulse motor driving circuit of the invention thus improves the speed of rotation in a self-excited pulse motor by compensating for the reduction of the torque caused by the time lag of the pulse signal in the feedback loop. This permits the pulse motor to be operated in a stable manner at high speed, even with a load which varies considerably such as, for example, the paper feeder of a line printer.

Each of the stator exciting circuit 16, the excitation switching circuit 14, the timer circuit 19 and the switch signal generating circuit 17 of FIG. 2 comprises any suitable circuit known in the art.

While the invention has been described by means of a specific example and in a specific embodiment, it should not be limited thereto, for obvious modifications will occur to those skilled in the art without departing from the spirit and scope of the invention.

We claim:

1. A pulse motor driving system for a pulse motor having a rotor and a stator having stator windings, said pulse motor driving system comprising
   rotor position detecting means for producing a signal corresponding to the position of the rotor, said rotor position detecting means including a pulse generating disc affixed to, and rotating with, the shaft of the rotor;
   speed detecting means for producing a speed signal corresponding to the speed of rotation of the rotor, said speed detecting means including the pulse generating disc;
   excitation switching means connected to the rotor position detecting means for sequentially exciting each stator winding with a phase difference for a phase of the stator corresponding to the position of the rotor by a signal corresponding to the rotor position; and
   phase difference switching means having inputs connected to the excitation switching means and coupled to the speed detecting means and outputs coupled to the stator windings for switching the phase difference between the phase of the stator corresponding to the position of the rotor and the exciting phase of the stator when the speed of rotation of the rotor reaches a predetermined magnitude corresponding to the speed signal.

2. A pulse motor driving system as claimed in claim 1, wherein the speed detecting means has an input coupled to the rotor and two outputs, and further comprising a timer circuit connected to one of the outputs of the speed detecting means for producing more than one standard pulse of different duration in accordance with the speed signal and switch signal generating means having an input connected to the other of the outputs of the speed detecting means, inputs connected to the timer circuit and outputs connected to the phase difference switching means for producing a switching signal corresponding to the speed of rotation of the rotor in accordance with the relationship of the speed signal to the standard pulse, said switching signal switching the phase difference between the phase of the motor and the exciting phase of the stator.

3. A pulse motor driving system as claimed in claim 2, wherein the standard pulse produced by the timer circuit has a duration substantially equal to the time interval of the speed signal produced by the speed detecting means during a speed of rotation which is likely to produce one phase difference for the phase difference between the predetermined phase of the motor and the exciting phase of the stator.

* * * * *